April 23, 1935.     E. H. BELDEN     1,998,604
DEVICE FOR UNLOADING COMPRESSORS
Original Filed July 23, 1932    2 Sheets-Sheet 1
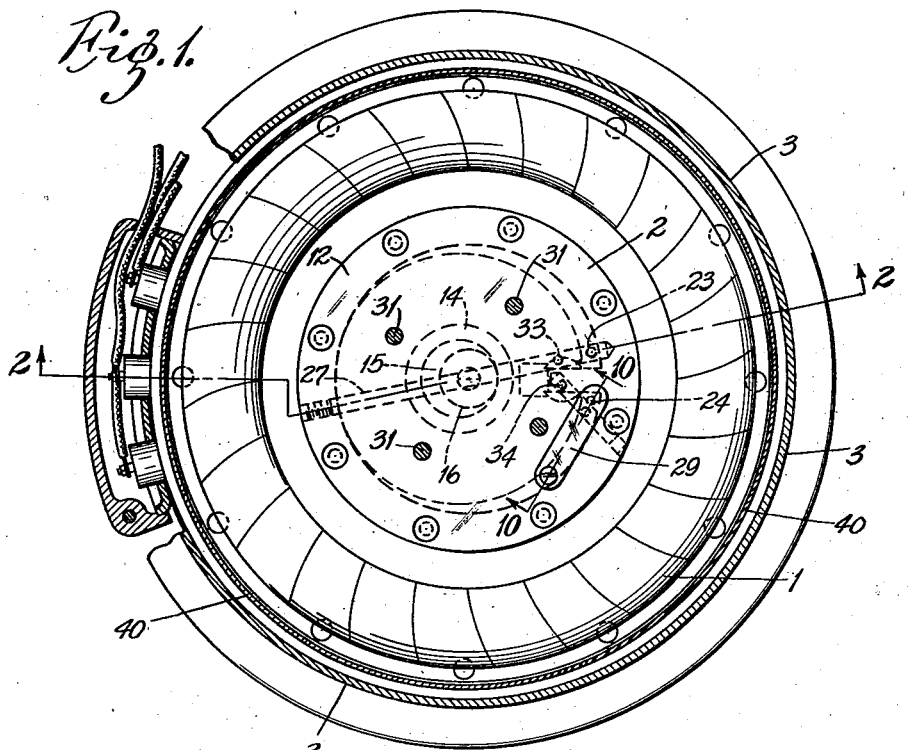
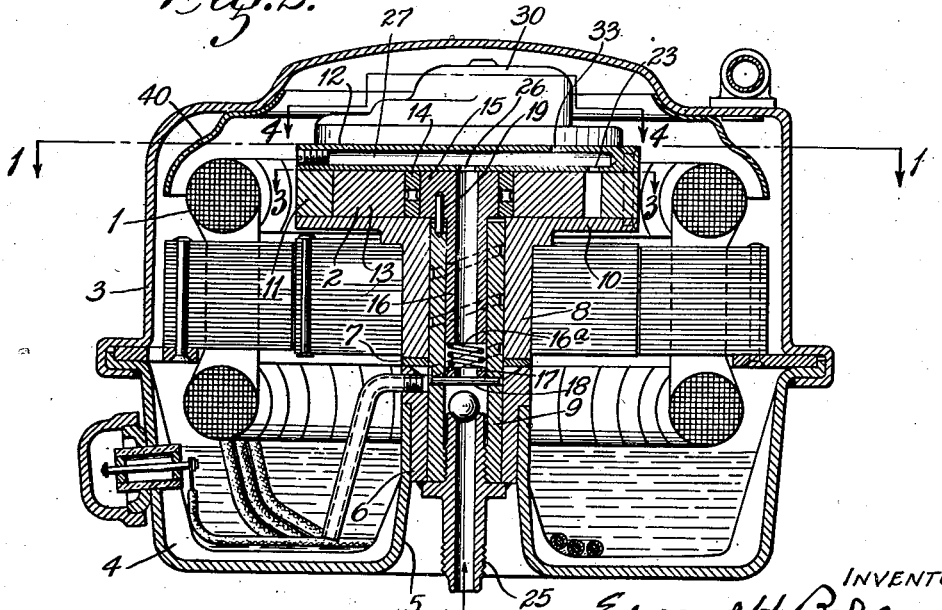
INVENTOR:
Edward H. Belden
by Cannot Cannot Knowly
HIS ATTORNEYS.

April 23, 1935.  E. H. BELDEN  1,998,604
DEVICE FOR UNLOADING COMPRESSORS
Original Filed July 23, 1932  2 Sheets-Sheet 2
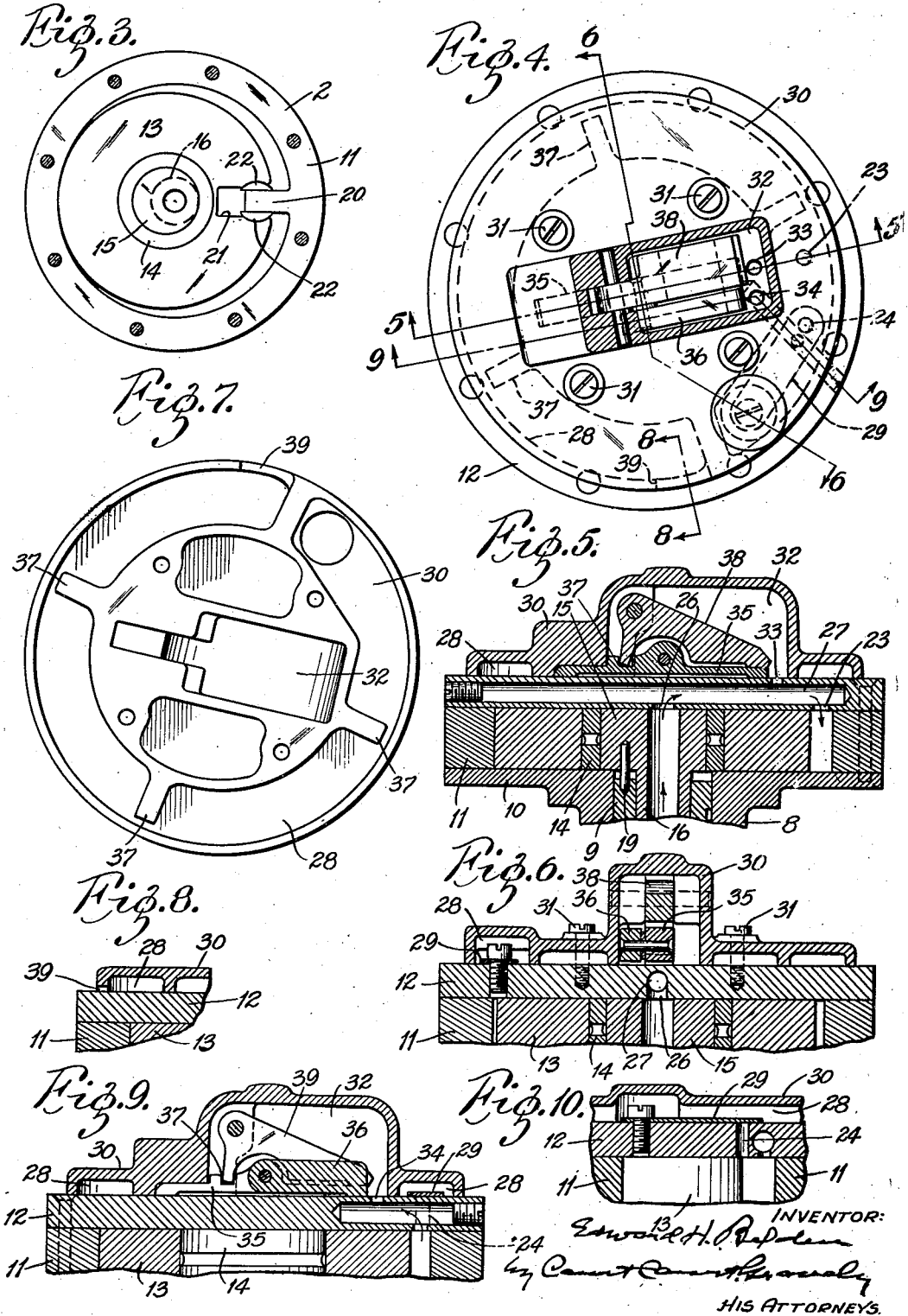

Patented Apr. 23, 1935

1,998,604

UNITED STATES PATENT OFFICE 1,998,604

DEVICE FOR UNLOADING COMPRESSORS

Edward H. Belden, Detroit, Mich.

Application July 23, 1932, Serial No. 624,212
Renewed March 8, 1934

7 Claims. (Cl. 230—29)

My invention relates to compressors or pumps. Its principal object is to provide for unloading the pressure therein when the pump or compressor ceases to operate, so as to facilitate starting. Other objects are to provide for the separation of oil from the compressed fluid and to minimize noise. The invention consists in the combinations and arrangements of parts hereinafter described and claimed.

In the accompanying drawings, wherein like reference numerals refer to like parts wherever they occur, Fig. 1 is a horizontal view partly in section on the line 1—1 of Fig. 2, and partly in plan, with portions of the compressor shown in dotted lines;

Fig. 2 is a vertical sectional view on the irregular line 2—2 of Fig. 1,

Fig. 3 is a detail view of the compressor with its top or cover plate removed,

Fig. 4 is a view of the pressure unloading and oil separating device partly in plan and partly in horizontal section on the line 4—4 of Fig. 2, Fig. 5 is a vertical sectional view thereof on the line 5—5 of Fig. 4, Fig. 6 is a vertical sectional view on the line 6—6 of Fig. 4, Fig. 7 is a detail view of the bottom of the pressure unloading and oil separating device, Fig. 8 is a vertical cross-sectional detail of the oil separating device, Fig. 9 is a vertical section on the line 9—9 of Fig. 4, and Fig. 10 is a similar section on line 10—10 of Fig. 1.

The construction illustrated in the accompanying drawings comprises an electric motor 1 and a compressor 2 rigidly secured to the armature sleeve thereof and all encased in an air tight housing 3 whose base member constitutes an oil receptacle 4. The middle portion of said base member is struck up into the form of a tubular boss 5 in which is fitted a short tubular sleeve 6 upon whose top is an annular washer or bearing member 7 upon which rests the end of the armature sleeve 8. Inside of said first mentioned sleeve is rigidly mounted a tubular stub spindle 9 on which the armature sleeve is rotatably mounted. A wide flange 10 at the top of the armature sleeve and integral therewith constitutes the bottom member of the cylindrical casing of the compressor. A cylindrical ring 11 constitutes the outer wall of the compression chamber and the top or cover thereof consists of a disk-like plate 12 which is secured to the armature flange or bottom member of the casing by rivets or screws that pass through said ring. Inside the compressor casing is a circular impeller 13 of smaller diameter mounted eccentrically so that at one point only it is approximately in contact with the cylindrical wall of the casing. This impeller is mounted on a floating ring 14 which in turn is mounted upon an enlarged cylindrical head or portion 15 of a tubular shank 16 which shank has a sliding fit in said tubular stub spindle 9 and is supported therein by a spring 16a whose lower end rests on a washer 17 mounted on a cross-pin 18 in said tubular stub spindle. Said enlarged cylindrical head 15 is eccentric with respect to said tubular stub spindle 9 and said compressor casing, and is held from turning by means of a dowel pin 19 fixed in the top of said stub spindle and having a sliding fit in a dowel hole provided therefor in the underside of said enlarged head of said shank.

The compressor casing has a radially disposed rib or vane 20 integral therewith and extending inwardly therefrom into a radial slot 21 provided therefor in the peripheral portion of the impeller. Said slot is provided with semicylindrical members 22 rockably mounted in semicylindrical grooves in the sides of the slot, whereby said members constitute guides or slideways for said vane and permit the vane to rock laterally as well as slide radially, during the rotation of the compressor. Close to the peripheral wall of the casing and also close to the vane but on opposite sides thereof are inlet and outlet openings 23, 24 of the compressor. The course of the incoming air or fluid is through a hollow spud or nipple 25 threaded into the base of the hollow stub spindle 9 and thence to and through a central axial bore in the shank 16 and its eccentric head 15 to a port 26 in central alinement therewith in the cover or top member of the compressor casing, and thence through a radially disposed passageway 27 therein to the inlet port 23 in the lower face of said top member, which inlet port opens into the crescent-shaped space between the impeller and the peripheral wall of the compressor casing. The delivery or outlet opening 24 extends directly through the top of the casing into an annular oil separating channel 28 and thence into the chamber formed by the main housing. This outlet opening or passageway is provided with a check valve such as a flat spring 29 adapted to yield to pressure inside the compression chamber but to close said passageway against the admission of air from the main housing chamber into the compressor.

The unloading device is secured directly to the top member of the compressor casing, as by screws 31; and is preferably made integral with an oil separator and a noise muffler, as by die-casting. This die-casting 30 comprises a housing or central chamber 32 open at the bottom and a low annular peripheral inverted channel 28 also open at the bottom. The top member of the compressor casing has two ports 33, 34 which communicate with said central chamber; one, 33, of said ports communicating with the radial inlet passageway 27 in said top member and the other port 34 communicating with the compression chamber. These two ports are under the control of automatically acting slide valves 35, 36, which cover the respective ports when the compressor is running and uncover them when the compressor is at rest. One, 35, of said valves comprises an elongated member whose end portions rest on the upper surface of the top member of the compressor casing and is disposed radially thereof. In its position of rest, said valve extends across the axis of the compressor nearly to the low pressure inlet port 33 so that movement due to centrifugal force will move it outwardly across said port.

In the top of said slide valve 35 is a notch 37 which receives the short downwardly extending arm of a bell crank lever 38, whose fulcrum is close to the axis of the compressor and whose longer arm is considerably heavier and longer than said short arm and extends across the axis of the compressor, and, when at rest, bears downwardly against the top of said slide valve. By reason of the engagement of the short arm of the bell crank lever with the slide valve 35, said slide valve will be moved inwardly or outwardly according to the position of said lever; and this position is determined by centrifugal force arising from the rotation of the compressor. When the compressor is at rest, said slide valve is pulled back by said lever clear of the port which communicates with the low pressure line of the compressor; whereas, when the compressor is running, centrifugal force causes the long arm of the bell crank lever to swing upwardly, thereby causing the short arm of said lever, cooperating with the centrifugal force on the valve itself, to move said valve outwardly far enough to cover said low pressure port.

Alongside of and pivotally connected to the middle portion of the low pressure slide valve 35 by a horizontal pivot is the second valve 36 which is merely a block whose outer end portion is adapted to slide back and forth across the port 34 which communicates with the compression chamber of the compressor. As this second valve 36 is hinged to the first mentioned valve 35, it slides therewith but is free to swing upwardly and thereby yield to the pressure in the compression chamber. When the compressor is at rest, the swinging valve 36 is clear of said port 34, so that the compression chamber is in open communication with the low pressure side of the system through port 34, the chamber of the unloader and the low pressure port 33. When, however, the compressor is running, centrifugal action causes said valves to slide outwardly across their respective ports and thereby block all direct communication between the low pressure line and the compression chamber except through the compressor.

In the normal operation of the compressor, more or less oil is carried by the air or fluid through the main delivery port 24 of the compressor casing into the annular channel 28 surrounding the unloading device. Baffle ribs 37 extend radially across said groove from the inner wall thereof almost to the outer wall; and the rib closest to the main delivery port preferably extends entirely across said groove. Close to this last mentioned rib, the bottom of the outer wall of the groove is cut away, as indicated at 39, to form a relatively large outlet opening. This arrangement constitutes both an oil separator and a noise muffler. Due to centrifugal action and to the openings past the baffle ribs being located alongside the outer wall, the oil is forced outwardly and along said wall until it reaches the peripheral groove through which it is forced outwardly and flung from the top edge of the compressor against a baffle plate 40 spaced from the motor when the oil drips into the receptacle therefor in the base of the main housing. This arrangement also constitutes a noise muffler because the air or other fluid passes from chamber to chamber in the annular channel through the openings at the outer ends of the baffle ribs before it is discharged into the main chamber of the housing through the relatively large opening formed in the outer wall of the annular channel.

What I claim is:

1. The combination with a compressor, whose casing rotates on a vertical axis and has two ports in its top of which one communicates with the low pressure line and the other port communicates with the compression chamber, of an unloading device comprising a hollow housing open at the bottom and secured to and fitting tight against the top of said casing, and centrifugally actuated, slidable valves for said ports respectively, the valve for the compression chamber port being yieldable to the pressure therein.

2. The combination with a compressor, whose casing rotates on a vertical axis and has two ports in its top of which one communicates with the low presssure line and the other port communicates with the compression chamber, of an unloading and oil separating device secured to the top of said casing and comprising a hollow housing and an annular channel surrounding the same and both open at the bottom and fitting tight against the top of said casing and centrifugally actuated slidable valves inside said housing for said ports respectively, the valve for said compression chamber being yieldable to pressure therein, said channel communicating with the main discharge port of the compressor and having an outlet at the bottom of its outer wall.

3. The combination with a compressor, whose casing rotates on a vertical axis and has two ports in its top of which one communicates with the low pressure line and the other port communicates with the compression chamber, of an unloading and oil separating device secured to the top of said casing and comprising a hollow housing and an annular channel surrounding the same and both open at the bottom and fitting tight against the top of said casing, and centrifugally actuated slidable valves inside said housing for said ports respectively, the valve for said compression chamber being yieldable to pressure therein, said channel communicating with the main discharge port of the compressor and having an outlet at the bottom of its outer wall and ribs on its inner wall extending radially close to the outer wall.

4. In combination with a compressor of the kind described, an unloading device comprising a closed chamber having one port communicating with the low pressure line of the compressor and a second port communicating with the compression chamber, a slidable valve for said first mentioned port, a centrifugally acting bell crank lever arranged with its short arm extending downwardly and engaging said valve to actuate the same, and a valve for said second mentioned port hinged to said first mentioned valve to slide therewith and swingable upwardly, said valves being clear of their respective ports when the long arm of said bell crank lever is down and closing said ports when said long arm is raised.

5. The combination of a compressor, whose casing rotates on a vertical axis and has two ports in its top of which one communicates with the low pressure line and the other port communicates with the compression chamber and an unloading device secured on top of said casing above said ports, said device comprising a hollow housing open at the bottom and fitting tight against the top of said casing, slidable valves for said ports, respectively, and a bell crank lever arranged with its short arm extending downwardly and operatively connected to said valves to actuate the same, the valve for the compression chamber port being yieldable to pressure in said chamber, said valves being clear of their respective ports when the long arm of said bell crank lever is down and closing said ports when said long arm is raised.

6. The combination with a compressor whose casing rotates on a vertical axis of a noise muffler rotatable with said casing, said muffler comprising an annular channel substantially concentric with said axis and into which said compressor discharges, said channel having baffles therein and an outlet therefrom.

7. The combination with a compressor whose casing rotates on a vertical axis of a noise muffler and oil separator rotatable with said casing, said muffler and separator comprising an annular channel substantially concentric with said axis and into which said compressor discharges, said channel having baffles extending radially outwardly from its inner wall and having a relatively large opening through the bottom portion of its outer wall.

EDWARD H. BELDEN.